Patented June 30, 1953

2,643,989

UNITED STATES PATENT OFFICE 2,643,989

CERIUM ESTERIFICATION CATALYST

Lawrence Arthur Auspos, Tonawanda, N. Y., and Jane Bowen Dempster, Woodbury, N. J., assignors to E. I. du Pont de Nemours & Company, Wilmington, Del., a corporation of Delaware No Drawing. Application September 20, 1949, Serial No. 116,846

4 Claims. (Cl. 260—75)

This invention relates to an improved method for the manufacture of glycol terephthalates and polymers thereof, and more particularly to such a method which employs a new and effective catalyst in the reaction mixture.

The preparation of glycol terephthalates by the reaction of glycols with terephthalic acid or its lower alkyl esters has assumed practical importance. Ethylene glycol terephthalate, prepared by the alcoholysis reaction of ethylene glycol with dimethyl terephthalate, for example, may subsequently be polymerized to form a material possessing properties that adapt it for use as an industrial fiber. In effecting the foregoing alcoholysis and polymerization procedures, catalysts have been necessary to accelerate the reactions and increase the conversions. While these objectives have been accomplished with previously disclosed catalysts such as lead monoxide, undesirable color development has almost invariably occurred. The devising of a catalytic process for the above purpose that would give efficient conversions and that would at the same time yield a product substantially free from color would constitute an important advance.

An object of the present invention is a novel and improved process for the manufacture of glycol terephthalates by the reaction of a glycol with terephthalic acid or its alkyl esters, whereby a product results that is to a large extent free from color and is of a relatively high viscosity. A further object is such a process wherein a novel catalytic material is employed to accomplish the improvement. A still further object is an effective catalytic process for polymerization of the glycol terephthalate formed in the above process. Additional objects will be disclosed as the invention is described in detail in the following.

We have found that the foregoing objects are accomplished when we react a glycol with terephthalic acid or its lower alkyl esters and carry out the reaction in the presence of a cerium-containing material as catalyst. The manufacture of ethylene glycol terephthalate by the reaction of ethylene glycol with dimethyl terephthalate is particularly advantageous because of the excellent results obtained. A number of forms of cerium may be used, but ordinarily it will be employed as the oxide or in metallic form. While cerium is effective in the preparation of monomeric ethylene glycol terephthalate, it is likewise useful in the polymerization of the monomeric material. Cerium may be used as the sole catalyst effectively, with preparation of material to a large extent free from color, as compared, for example, with similar material in the preparation of which lead oxide has functioned as catalyst. It may also be used advantageously in combination with a second catalyst, such as compounds containing zinc or calcium. Cerium alloys with other metals may be used advantageously.

In carrying out the process, the effect of various catalysts was determined by the following procedure. The desired amounts of dimethyl terephthalate and ethylene glycol were introduced into a small distillation flask, and the catalyst was added. The flask was heated for several hours and the methanol distilled over was collected, the amount formed being taken as an indication of the percentage completion of the alcoholysis reaction. In the preparation of the monomer, the vapors distilling over were not allowed to exceed 70–75° C., and the temperatures of the contents of the flask were maintained at 210–255° C. or below. The monomer was then introduced directly in measured amount into a polymerization tube of 25 mm. outside diameter. The tube was provided with a side arm for distillation purposes, and a capillary extended nearly to the bottom of the tube, through which pure, dry nitrogen gas was introduced. A flask was connected to the side arm to collect the distillate, this flask being provided with a vacuum pump connection. The tube was then heated and the excess glycol distilled over. With full vacuum in the system, the contents were heated at 265° C. for several hours. After the polymerization cycle was complete, a comparison of the color of the polymer with known color standards was made and the viscosity of the polymer was measured.

Following the foregoing procedure, the catalysts of the present invention were shown to give superior results with respect to quality, as determined by the color and viscosity of the polymer produced. The polymer obtained when litharge (PbO) was used as the catalyst was the standard of comparison, since this material had been the preferred catalyst previously. In designating color, numerical values are employed, 1 designating the color present in a tube containing a known quantity of a dye, 2 representing twice the amount of color in 1, etc. The same considerable excess of ethylene glycol was used in all preparations, for example, 3 or 4 parts to 1 by weight, though such ratios are not to be taken as limiting.

When, for example, 0.01% of ceric oxide based on the weight of dimethyl terephthalate was used in the alcoholysis of 25 g. dimethyl terephthalate by means of an excess of ethylene glycol, the alcoholysis was complete in 240 min. at 210–225° C., and the color of the polymer obtained from this material after polymerization for 7 hrs. was 2 on the scale previously described, whereas the color of control polymers prepared with a lead monoxide catalyst was 4. When 0.02% cerous terephthalate was used in the alcoholysis of 50 g. dimethyl terephthalate, the polymer formed from the monomeric ethylene glycol terephthalate thus obtained had a color of 4 in comparison with a color of 7 for the control polymer, in the preparation of which lead monoxide had been used as catalyst. The use of cerium compounds is thus decidedly advantageous from the viewpoint of color of the material after polymerization.

Cerium-containing materials show further advantages as catalysts in the preparation of ethylene glycol terephthalate in that the viscosity of the polymers obtained from the monomeric material prepared by the use of these catalysts is equal to or greater than the viscosity of similar polymers wherein lead monoxide is used as the catalyst, and greater than the viscosity of polymers prepared by the use of many other catalysts, while at the same time the polymeric products obtained by the use of cerium-containing materials have the added advantage of being substantially free from color.

The presence of a second catalyst along with the cerium compound has been found desirable in many cases, and materials containing zinc and calcium have proved advantageous as cooperating catalysts.

The amount of catalyst is not a limiting factor, but generally it is found desirable to employ more than 0.001% of the weight of the terephthalic acid or its ester. An amount of catalyst in excess of 0.05% will be generally unnecessary or undesirable.

The catalysts of the present invention function in the formation of both monomers and polymers as accelerants of the reaction and as materials that allow the obtaining of a substantially color-free product of relatively high viscosity.

Ethylene glycol has been used in the examples cited and will ordinarily be the preferred diol because of its availability and the desirable products obtained. Other glycols may be employed, however, of the general formula, HO—$(CH_2)_n$—OH, where $n$ is a number greater than 2 and not greater than 10. Such other glycols will include diethylene glycol; 2,2-dimethyl-1,3-propanediol sometimes designated pentaglycol; and the like.

Where the term lower alkyl esters is used, moreover, we intend this to include only esters of alcohols containing not more than four carbon atoms. In addition to dimethyl terephthalate, therefore, such esters as diethyl and dibutyl terephthalates are within the scope of the invention.

The invention has been described adequately in the foregoing. It will be understood, however, that many variations may be introduced in details of procedures, quantities and specific formulas of reactants, without departure from the scope of the invention. We wish to be limited, therefore, only by the following claims.

What is claimed is:

1. A process for the manufacture of a polymerized ester of terephthalic acid, which comprises reacting a glycol of the general formula $$HO—(CH_2)_n—OH$$

in which $n$ is a number not less than 2 and not greater than 10 with a lower dialkyl ester of terephthalic acid in the presence of a catalyst taken from the class consisting of metallic cerium and cerium oxides, the reaction temperature being not higher than 265° C., said lower dialkyl esters being esters of an alcohol containing not more than four carbon atoms.

2. A process for the manufacture of the polymerized ethylene glycol ester of terephthalic acid, which comprises reacting ethylene glycol and dimethyl terephthalate in the presence of a catalyst taken from the class consisting of metallic cerium and cerium oxides, the reaction temperature being not higher than 265° C.

3. The process of claim 2, in which metallic cerium is introduced into the reaction mixture.

4. The process of claim 2, in which cerium is introduced in the form of an oxide.

LAWRENCE ARTHUR AUSPOS.
JANE BOWEN DEMPSTER.

References Cited in the file of this patent

UNITED STATES PATENTS

| Number | Name | Date |
|---|---|---|
| 1,819,818 | Jaeger | Aug. 18, 1931 |
| 1,975,246 | Zwilgmeyer | Oct. 2, 1934 |
| 1,980,441 | Salzberg | Nov. 13, 1934 |
| 1,993,552 | Izard | Mar. 5, 1935 |
| 2,465,319 | Whinfield et al. | Mar. 22, 1949 |

OTHER REFERENCES

Spangenberg, Industria y Quimica (Buenos Aires), vol. 7, pages 393–401 (1945).

Sandor, Magyar Chem. Folyoirat, vol. 38, pages 1–8 (1932); also in Chem. Ab., vol. 26, page 2411.

Lel 'Chuk, Izvest. Akad. Nauk. (USSR), Otdel Khim Nauk, vol. 191, page 200 (1946); also in Chem. Ab., vol. 42, page 6630.

Koton, J. Gen. Chem. (USSR), vol. 6, pages 1444–1451 (1936).